March 15, 1966 R. L. HANKINS ETAL 3,240,368
HANDLING AND SUPPORT FRAME FOR CAMPER BODIES
Original Filed Nov. 28, 1960 2 Sheets-Sheet 1
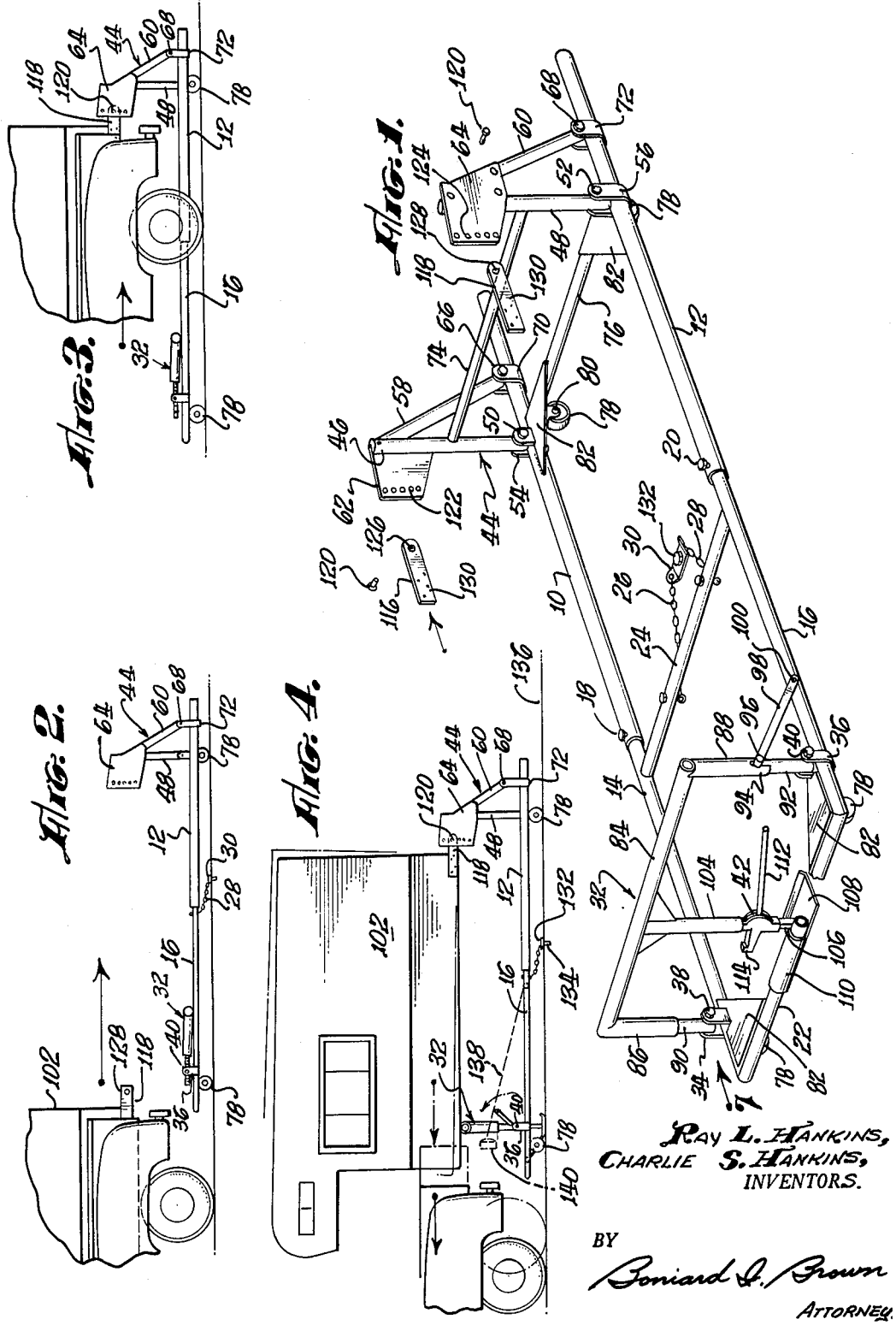
Ray L. Hankins,
Charlie S. Hankins,
INVENTORS.
BY
Boniard I. Brown
ATTORNEY.

March 15, 1966  R. L. HANKINS ETAL  3,240,368
HANDLING AND SUPPORT FRAME FOR CAMPER BODIES
Original Filed Nov. 28, 1960  2 Sheets-Sheet 2
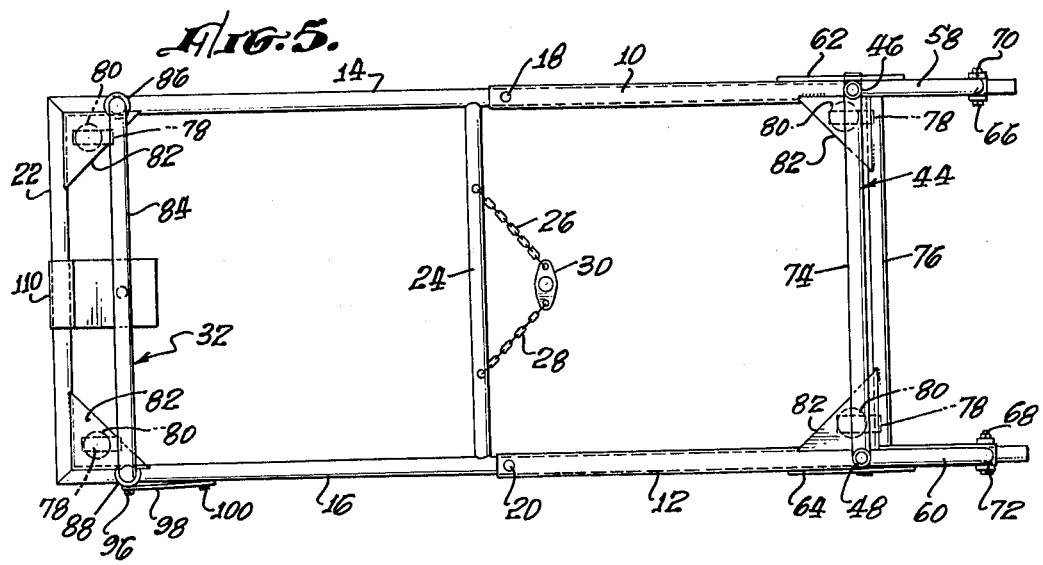
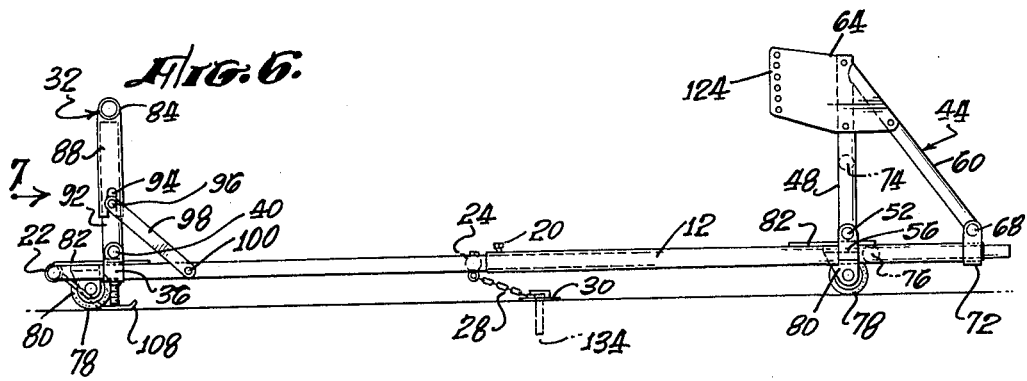
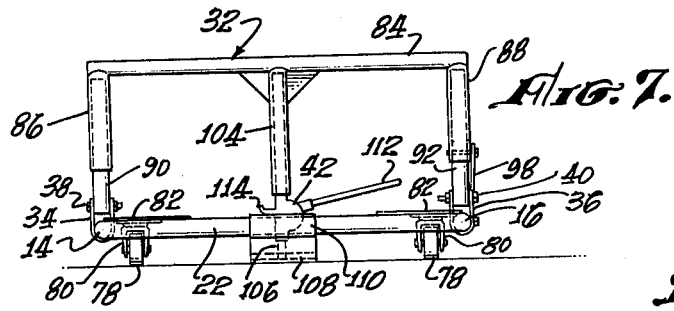
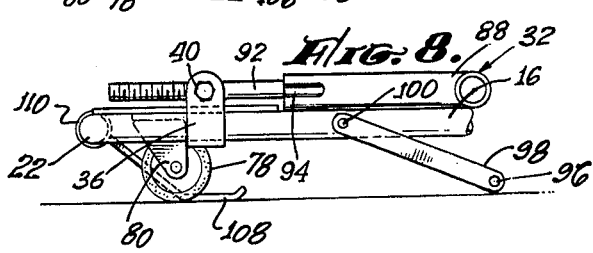
RAY L. HANKINS,
CHARLIE S. HANKINS,
INVENTORS.
BY
Boniard I. Brown
ATTORNEY United States Patent Office 3,240,368
Patented Mar. 15, 1966

3,240,368
HANDLING AND SUPPORT FRAME FOR CAMPER BODIES
Ray L. Hankins, Lompoc, Calif. (7622 Waller Road, Tacoma, Wash.), and Charlie S. Hankins, Cucamonga, Calif. (11902 Woodland Ave., Puyallup, Wash.)
Continuation of application Ser. No. 71,934, Nov. 28, 1960. This application Aug. 1, 1963, Ser. No. 303,196
6 Claims. (Cl. 214—38)

The present application is a continuation of application Serial No. 71,934, filed on November 28, 1960, now abandoned.

The present invention relates generally to apparatus for handling camper bodies which are adapted to be mounted on vehicles; more particularly, the invention relates to a handling and support apparatus for use in installing camper bodies on vehicles, for removing camper bodies from vehicles and for supporting the camper bodies.

The devices which have heretofore been provided for installing camper bodies, carriers and the like on vehicles, for removing them from vehicles and for storing them have been characterized by certain shortcomings and disadvantages. Any one device has not been well adapted for the convenient installation, removal and supporting of the camper bodies. The devices or frames of the prior art generally extend over or about the bodies of vehicles, and there is therefore provided poor access for operating and attaching equipment, such as jacks. The devices have required considerable time and labor for the installation or removal of camper bodies and the like. They have not provided a high degree of sturdiness and ruggedness, which are desirable under adverse conditions of shock and heavy loads.

The present invention provides an improved camper body handling and support frame or apparatus which includes a main frame having an adjustable front section in its forward end and a rigidly upwardly extending rear section on its opposite end. The front frame section is so connected or mounted that it may be moved to a lowered position to facilitate the passage thereover of a vehicle carrying a camper body, and that it may be moved to a raised position under the camper body. The camper body may be secured to the rear section of the frame by means of appropriate adjoining parts and bolts. Elevating means, such as a jack, may preferably be connected with the front frame section to elevate the front section to support the camper body. Anchoring means engage the handling frame to prevent its movement during the installation and removal of a camper body, and a brace is engageable with the front frame section to retain it in its raised position. Casters are preferably provided for supporting the frame for independent movement in transporting a camper body independently of a vehicle.

The invention provides an efficient and conveniently usable handling and support apparatus which is operable from the rear end of a vehicle, and which is movable longitudinally relative to the vehicle for the installation of a camper body on the vehicle or the removal of a camper body from the vehicle. It is adapted for the removal of a camper body by the backing of a vehicle over the handling frame, attaching the camper body to the rear frame section of the apparatus, driving the vehicle forward, positioning the adjustably mounted frame section under the camper body, elevating the front frame section to support the camper body, and driving the vehicle away from the handling frame. The installation of a camper body on a vehicle is performed by reversing these steps. The handling and storage apparatus of the invention is therefore adapted for the convenient installation of a camper body on a vehicle, the convenient removal of a camper body, and for the convenient independent movement of a camper body on the handling apparatus.

It is therefore an object of the present invention to provide a new and improved handling and support frame for camper bodies.

An object of the invention is the provision of a handling frame for camper bodies which minimizes the labor and time required for installing a camper body on a vehicle or removing a camper body from a vehicle.

It is an object of the invention to provide a handling apparatus for camper bodies which is of simple and economical construction.

An object of this invention is to provide a handling apparatus for camper bodies which is operable by one person for the installation and removal of a camper body.

It is an object of the present invention to provide a handling apparatus for camper bodies and the like which facilitates the convenient installation, removal, transporting and storage of camper bodies.

An object of this invention is the provision of a handling frame for camper bodies wherein a front frame section is movable to a lowered position for the passage thereover of a vehicle carrying a camper body, and which is movable to a raised position to support the camper body.

It is an object of this invention to provide a handling frame according to the foregoing object wherein elevating means are provided for elevating the front frame section to support a camper body to permit its removal from and installation on a vehicle.

An object of this invention is the provision of a handling apparatus for camper bodies according to certain of the foregoing objects wherein anchoring means secure the apparatus against movement during the installation or removal of a camper body.

It is an object of this invention to provide a handling and support frame for camper bodies which is adjustable to accommodate camper bodies of different sizes.

An object of this invention is the provision of a handling frame for camper bodies which is supported on casters to provide mobility for the convenient independent transporting of camper bodies.

Other objects, features and advantages of the present invention will become apparent to those versed in the art from a consideration of the following description, the appended claims and the accompanying drawings, wherein:

FIGURE 1 is a perspective view of a preferred embodiment of the handling and support frame of the present invention, showing the parts thereof positioned for supporting a camper body;

FIGURE 2 is an elevational view of the handling and support frame of FIGURE 1 showing the frame in operative relation with a pick-up truck, only a fragmentary portion of the truck being shown;

FIGURE 3 is an elevational view, similar to the view of FIGURE 2, showing the pick-up truck positioned over the frame with the camper body secured to the frame;

FIGURE 4 is an elevational view, similar to those of FIGURES 2 and 3, showing the camper body secured to the handling frame and supported thereon;

FIGURE 5 is a plan view of the camper body handling frame of FIGURE 1;

FIGURE 6 is an elevational view of the handling and support frame of FIGURES 1 and 5;

FIGURE 7 is an end view of the handling and support frame of FIGURES 1, 5 and 6, taken as indicated by the arrows 7 in FIGURES 1 and 6; and FIGURE 8 is an enlarged partial view showing the front frame section in its lowered position.

Referring to the drawings, and particularly to FIGURES 1, 5, 6 and 7, there is shown a preferred embodiment of the camper handling and support frame of the present invention. A main frame section includes a pair of tubular telescoping side beams 10, 12 which include beam portions or rods 14, 16 adjustably secured in the beams by means of thumb screws 18, 20. A front cross-bar 22 is secured as by welding between the front or forward end of the rods 14 and 16, and an intermediate cross-bar 24 is similarly secured between portions of the rods 14 and 16 in the central portion of the frame. A pair of chains 26, 28 secure the cross-bar 24 to a tie-down plate 30, as shown. An inverted U-shaped front frame section 32 is pivotally connected to the front portions of rods 14 and 16 by a pair of brackets 34, 36 and cooperating bolts 38, 40, as shown. A conventional manually operable jack 42, of the type adapted to cooperate with automobile bumpers, is connected with the front frame section 32, as shown in FIGURE 7 and as described hereinafter in detail. A rear frame section 44 has its vertical post members 46, 48 secured by bolts 50, 52 to brackets 54, 56 on the beams 10, 12, respectively. Diagonal braces 58 and 60 are connected to mounting plates 62, 64 on the respective upper ends of the posts. The braces have their lower ends connected by bolts 66, 68 to brackets 70, 72 on beams 10 and 12, as shown. An upper horizontal cross-bar 74 is secured by welding between the posts 46 and 48, and a lower horizontal cross-bar 76 is similarly secured between the beams 10 and 12. Rollers 78 of casters 80 depend from gusset plates 82, one of which is located in each of the corners of the frame.

The front frame section 32 has a horizontal tubular upper cross-bar 84 from which depend a pair of vertical telescoping arms 86, 88 from which extend telescoping arm portions 90, 92, respectively. The lower ends of the telescoping arms are pivotally connected by bolts 38, 40 to brackets 34, 36 on frame side beams 10, 12. Defined in the lower portion of arm 88 is a slot 94 to slidably accommodate a bolt 96, which pivotally connects the upper end of a diagonal brace element 98 to telescoping arm portion 92. The lower end of brace 98 is pivotally connected by a bolt 100 to the rod 16. From the geometrical relations of the parts, it will be understood that the brace 98 prevents the front frame section 32 from tilting and retains it in its raised or vertical position, as shown in FIGURE 6. By disconnecting either end of the brace 98 the front frame section 32 may be tilted or moved downwardly to its lowered position shown in FIGURES 2, 3 and 8.

As shown in FIGURES 7 and 8, the jack 42 has its upper portion secured in a tubular element 104, which is welded to the horizontal cross-bar 84 of the front frame section. The lower end portion 106 of the jack rests on a base shoe 108 which extends from a sleeve 110 pivotally mounted on the cross-bar 22. The jack is manually operable by means of a handle 112 to elevate or lower the cross-bar 84 and its associated parts. An arm 114 extends from the conventional automobile jack 42, and serves no purpose in the operation of the apparatus of the present invention. The base shoe 108 serves as a foundation for supporting the weight of a camper body in such manner that if the camper body on the handling frame is accidentally moved while supported by the jack, the base shoe 108 also moves, thereby preventing the tilting and spilling of the camper body from the handling frame. The base shoe 108 also serves to prevent the loaded jack from sinking into the ground or foundation on which it rests, thereby preventing damage to the foundation and spilling of the camper body.

A pair of mounting brackets 116, 118 are secured to the camper body 102, as indicated in FIGURES 2 and 4. The brackets may be secured to the mounting plates 62, 64 by bolts 120, as indicated in FIGURES 1 and 4. The bolts 120 may be extended through any of the openings 122, 124 in the respective plates 62, 64 and through a registering opening 126, 128 of the respective brackets 116, 118. The brackets are secured to the camper body by bolts, screws or similar fastening elements which extend through openings 130 in the brackets.

As shown in FIGURE 4, there may be provided a chain 138 which is secured to and extends from the cross-bar 24 and which is connected to a saddle element 140 which is adapted to engage the rear bumper of the vehicle. The chain and saddle serve as a positioning mechanism for the accurate location of the vehicle relative to the forward end of the camper body 102 during the step in the installing or removing a camper body which is illustrated in FIGURE 4, and which is hereinafter described.

In the operation of the handling and support frame to remove a camper body from a vehicle such as a pick-up truck, the anchor chains 26, 28 are first secured to the tie-down plate 30, which is secured by a bolt 132 to an anchor socket 134 in a concrete slab. The brackets 116, 118, are, of course, mounted on the camper body, as shown in FIGURE 2. With the brace 98 disengaged either from the tubular member 16 or from the telescoping arm part 92, the front frame section 32 is pivoted about the bolts 38, 40 and moved to the lowered position shown in FIGURES 2 and 8. The vehicle or pick-up truck is moved in a reverse direction over the frame, as illustrated in FIGURES 2 and 3, to a position wherein the brackets 116, 118 on the camper body are in registration with the mounting plates 62, 64 on the rear frame section. A bolt 120 is then inserted through the respective openings 126, 128 in plates 116, 118 and through registering openings 122, 124, in plates 62, 64 respectively, and is secured by a nut.

With the camper body thus secured to the rear frame section, the vehicle is driven forward until the forward end of the camper body is positioned near the end of the supporting surface or bed of the vehicle or truck, as indicated in FIGURE 4. The vehicle may be accurately positioned by means of the chain 138 and the saddle 140, the latter being secured to the vehicle bumper and the chain being of the correct length for automatically establishing the vehicle position. It provides a safety device to prevent driving outfrom underneath the camper. For example the truck may be moved forward until the forward end of the camper body is within six to eight inches of the end of the truck bed. The vehicle brakes are then set. The front section 32 of the frame is pivoted about the bolts 38, 40 to the raised or vertical position shown in FIGURES 1 and 4.

The horizontal cross-bar 84, telescoping arms 86, 88 and tubular element 104 of the front frame section are elevated by means of the jack 42 to a position wherein the camper body is supported by the front frame section and by the jack, as shown in phantom outline in FIGURE 4, in which position the camper body is clear of the vehicle bed on which it normally rests. The brace 98 is secured to the telescoping arm part 92 and to the frame side beam 16, thereby preventing forward tilting of the front frame section and retaining the front frame section in its raised position. Spilling of the camper body is therefore prevented.

With the camper body secured to and supported by the handling and support frame, the vehicle is driven away from the handling frame, as indicated by the arrow in FIGURE 4. The jack 42 is then operated by means of the handle 112 to lower the camper body and cross-bar 84 until the cross-bar 84 is supported on the upper ends of the telescoping arm parts 90, 92, in the position shown in FIGURE 7. The weight of the camper body is thereby removed from the jack and from the shoe base 108. The handling frame supporting the camper body may then be moved about on its supporting casters 78 after the tie-down plate 30 is disengaged by removing the bolt 132 from the anchor socket 134. The handling frame may be moved manually or by means of a vehicle, and may be conveniently transported to any desired location. The camper body may be supported indefinitely on the handling frame during storage.

The operation of the handling frame to install a camper body on a vehicle is the reverse of the operation hereinbefore described. The jack 42 is first operated to raise the camper body to the position shown in phantom outline in FIGURE 4, wherein the camper body is supported by the jack. The vehicle is then moved in a reverse direction to the position shown in phantom outline in FIGURE 4, wherein the rear of the vehicle bed is below the forward portion of the camper body. The jack 42 is then operated by means of the handle 112 to lower the camper body and the horizontal cross-bar 84 of the front frame section so that the front portion of the camper body rests upon the vehicle bed. The brace 98 is disengaged at one end by removing one of the bolts 96, 100, and the front frame section 32 is pivoted about the bolts 36, 38 to the lowered position shown in FIGURES 2 and 8. The vehicle is then moved in reverse direction to the position indicated in FIGURE 3. The bolts 120 are disengaged from the brackets 116, 118 on the camper body and from the plates 62, 64 on the rear frame section. The vehicle is driven in a forward direction over and away from the handling frame.

After the camper body is thus installed on the vehicle and removed from the handling frame, the bolt 132 may then be disengaged from its anchor socket 134 to release the tie-down plate 132, thereby permitting the handling frame to be moved on its casters to a desired storage location.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventors claim:

1. A camper body handling and support apparatus comprising an elongated main frame having telescoping side beams connected by cross-bars, whereby the frame is adjustable for the installation thereon of camper bodies of different sizes, a rigid rear frame section extending upwardly from the rear end of the frame, means for attaching a camper body to said rear section, a front frame section having telescoping side arms, said front section arms being pivotally mounted on the front end of the main frame for movement to a lowered position to permit a vehicle carrying a camper body to pass thereover and for movement to a raised position under the camper body, elevating means positioned to elevate said front frame section to support the camper body, and anchoring means engaging the frame to prevent movement thereof during the installation and removal of a camper body.

2. A camper body handling and support apparatus comprising an elongated main frame having telescoping side beams connected by cross-bars, whereby the frame is adjustable for the installation thereon of camper bodies of different sizes, a rigid rear frame section extending upwardly from the rear end of the frame, means for attaching a camper body to said rear section, a front frame section having telescoping side arms depending from a cross-bar, said front section arms being pivotally mounted on the front end of the main frame for movement to a lowered position to permit a vehicle carrying a camper body to pass thereover and for movement to a raised position under the camper body, brace means for supporting the front frame section in said raised position, jack means positioned to elevate said front frame section to support the camper body, and anchoring means engaging the frame to prevent movement thereof during the installation and removal of a camper body.

3. A camper body handling and support apparatus comprising an elongated main frame having telescoping side beams connected by cross-bars, whereby the frame is adjustable for the installation thereon of camper bodies of different sizes, a rigid rear frame section extending upwardly from the rear end of the frame, means for attaching a camper body to said rear section, an adjustable front frame section pivotally connected with the main frame for movement to a lowered position to permit a vehicle carrying a camper body to pass thereover and for movement to a raised position to support the camper body, elevating means connected with the front frame section to elevate the front section to support the camper body, means for retaining the forward frame section in said raised position, and casters supporting the frame for independent movement.

4. A camper body handling and support apparatus comprising a rectilinear main frame having side beams connected by cross-bars, an inverted generally U-shaped front frame section including telescoping arms extending downwardly from the ends of a cross-bar, means pivotally connecting said telescoping arms to the respective side beams of the main frame section whereby the front frame section is movable to a lowered position to permit the passage thereover, of a vehicle carrying a camper body and is then movable to a raised position under the camper body, means for elevating the front section to support the camper body, brace means engageable with the front frame section to retain the front section in said raised position, a rear frame section rigidly connected with and extending upwardly from said rectilinear main frame, means for securing the camper body to the rigid rear frame section, an anchoring means connected to the handling and support apparatus to prevent movement thereof during the installing and removing of the camper body.

5. A camper body handling and support apparatus comprising an elongated main frame having telescoping side beams connected by cross-bars, whereby the frame is adjustable for the installation thereon of camper bodies of different sizes, an inverted generally U-shaped front frame section including telescoping arms extending downwardly from the ends of a cross-bar, means pivotally connecting said telescoping arms to the respective side beams of the main frame section whereby the front frame section is movable to a lowered position to permit the passage thereover of a vehicle carrying a camper body and is then movable to a raised position under the camper body, jack means connected with the front frame section for elevating the front section to support the camper body, brace means engageable with the front frame section to retain the front section in said raised position, a rear frame section rigidly connected with and extending upwardly from said main frame, means for securing the camper body to the rigid rear frame section, and anchoring means connected by at least one chain to one of said cross-bars of the main frame to prevent movement of the handling apparatus during the installing and removal of the camper body.

6. A camper body handling and support apparatus comprising a rectilinear main frame section having telescoping side beams connected by cross-bars, screws on said side beams for locking telescoping portions thereof in selected positions to accommodate the size of a camper body, anchoring means engaging the main frame and securing the frame relative to the ground, a front frame section having telescoping side arms pivotally mounted on the forward end of the main frame section, whereby the front frame section is movable to a lowered position for the passage thereover of a vehicle carrying a camper body and is then movable to a raised position under the camper body, brace means for supporting the front section in said raised position, elevating means connected with said front frame section to elevate the front section to support the camper body, a rigid rear frame section extending upwardly from the rear end of the frame, means for attaching a camper body to said rigid section, and casters supporting the handling and support apparatus for independent movement.

References Cited by the Examiner

UNITED STATES PATENTS

| | | | |
|---|---|---|---|
| 2,151,640 | 3/1939 | Menning | 214—515 X |
| 2,805,786 | 9/1957 | Green | 214—84 |
| 2,995,397 | 8/1961 | Eames | 214—515 |
| 3,070,041 | 12/1962 | Gutridge | 214—38.46 X |

FOREIGN PATENTS 704,550   2/1954   Great Britain.

GERALD M. FORLENZA, *Primary Examiner*.

HUGO O. SCHULZ, *Examiner*.